H. F. TAYLOR.
MEANS FOR DETERMINING COLOR COMBINATIONS.
APPLICATION FILED MAY 19, 1917.
1,308,512.
Patented July 1, 1919.
3 SHEETS—SHEET 2.
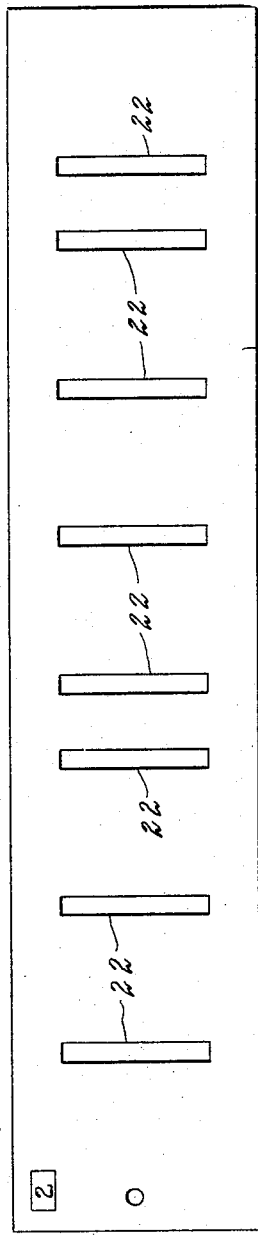
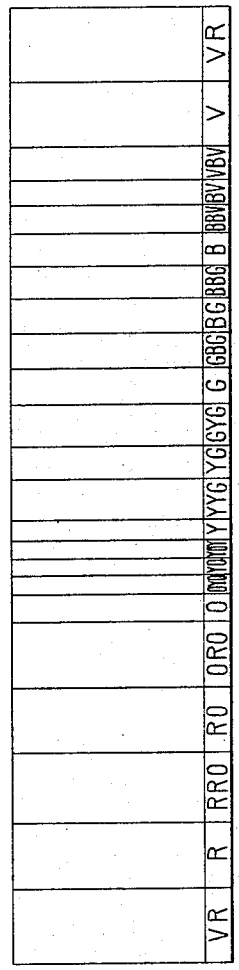
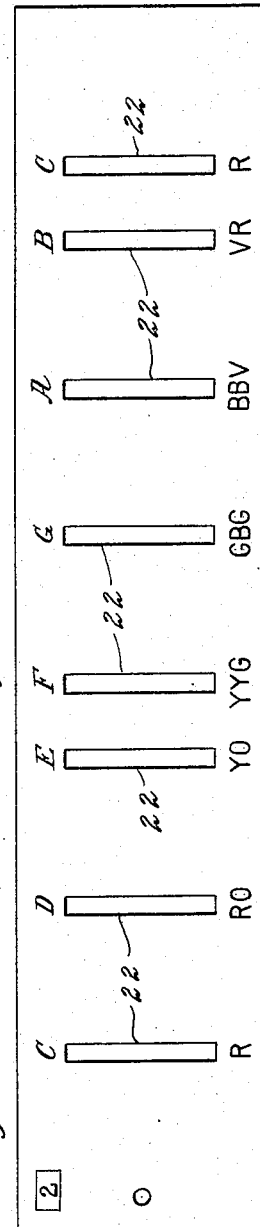
INVENTOR
Henry Fitch Taylor
BY
his ATTORNEYS
WITNESS:

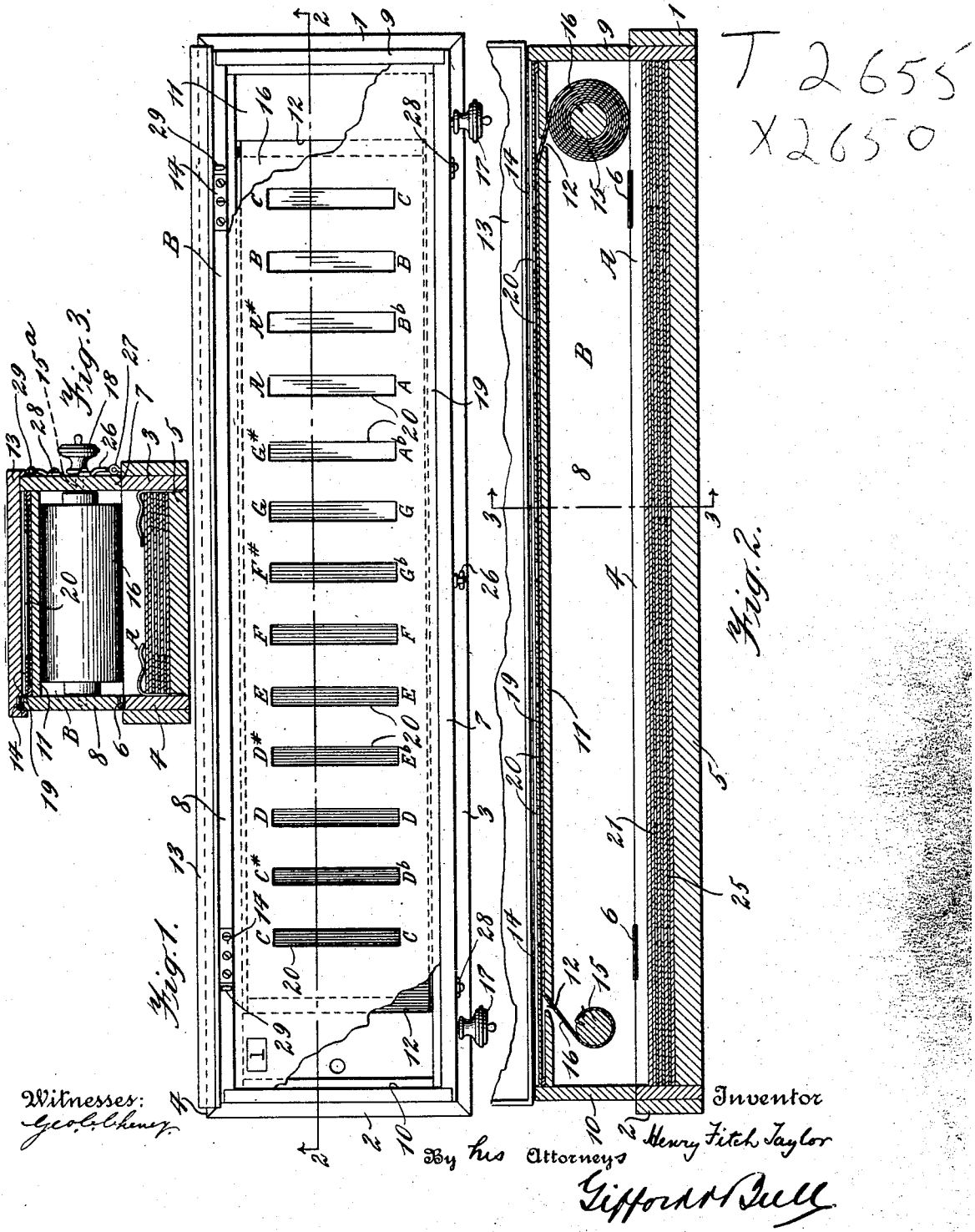

H. F. TAYLOR.
MEANS FOR DETERMINING COLOR COMBINATIONS.
APPLICATION FILED MAY 19, 1917.
1,308,512.
Patented July 1, 1919.
3 SHEETS—SHEET 3.
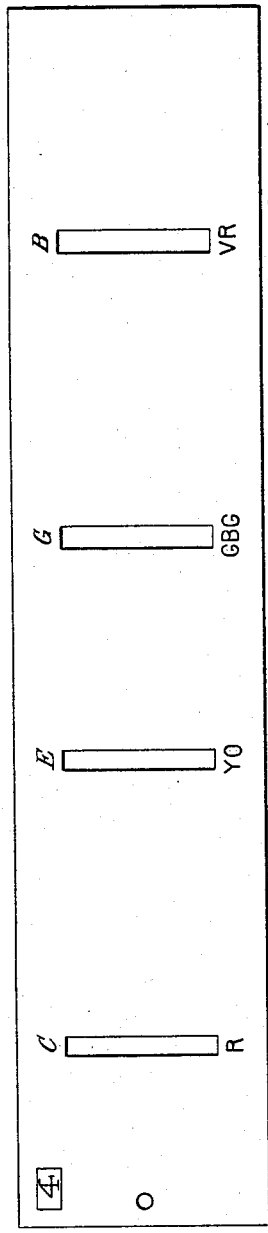
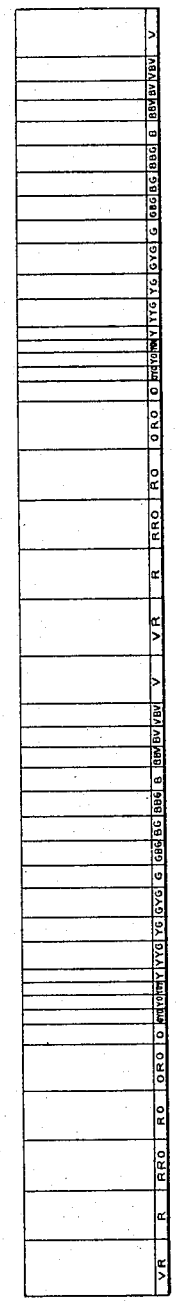
WITNESS:
INVENTOR
Henry Fitch Taylor
BY
Gifford Bull
his ATTORNEYS

UNITED STATES PATENT OFFICE.

HENRY FITCH TAYLOR, OF NEW YORK, N. Y.

MEANS FOR DETERMINING COLOR COMBINATIONS.

1,308,512.  Specification of Letters Patent.  Patented July 1, 1919.

Application filed May 19, 1917. Serial No. 169,611.

*To all whom it may concern:*

Be it known that I, HENRY FITCH TAYLOR, a citizen of New York, residing at New York city, borough of Manhattan, in the county of New York and State of New York, have invented certain new and useful Improvements in Means for Determining Color Combinations, of which the following is a specification.

My invention relates to new and useful improvements in means for ascertaining and determining combinations of colors, or shades, or tints of colors, which will be in proper harmony.

It has long been believed that musical tones and colors are correlated, although as far as I am aware no means has ever been devised, or principle established, whereby any supposed correlation could be definitely ascertained and employed to determine proper color combinations. I have discovered that the chromatic scale, as employed in music, bears a definite relation to color as the same exists within the visible limits of the solar spectrum, and that proper harmonies produced by combinations of musical tones existing in the chromatic musical scale find their equivalent or response in harmonious color combinations selected from the solar spectrum, so that combinations of musical tones which are in proper harmony can be employed for the purpose of selecting and correlating colors from the solar spectrum which will be in proper harmony.

In carrying out my invention, I employ the solar spectrum, or a representation of it, of any given length, in which the colors bear the proper relation to each other, for instance, the spectrum of Fraunhofer, and provide means whereby the spectrum may be divided in accordance with the tones of the octave of the chromatic musical scale, and produce or determine harmonious color combinations by selecting those color areas of divisions which find harmonious counterpart in tones selected from the chromatic musical scale. In other words, indicating means is provided determined in accordance with harmonious combinations of tones in an octave of the chromatic musical scale, and is made applicable to the solar spectrum in such way that harmonious color combinations may be ascertained by reference to the said harmonious tone combinations in the indicating means.

The invention is of wide importance because it provides a guide by which, not only those versed in the proper selection of color combinations, but also those entirely ignorant of such combinations, may by its practice ascertain definitely and invariably combinations which will be correct for use for artistic purposes, such as pictorial paintings, but also for decorative purposes, in fact, in any situation where a correct combination of colors is desirable or essential. It can also be employed to visualize music and make the reading of it easier and more interesting.

The invention consists in the improvement to be more fully described hereinafter, and the novelty of which will be particularly pointed out and distinctly claimed.

I have fully and clearly illustrated in the accompanying drawings a preferred embodiment of an apparatus for practising my invention, and wherein—

Figure 1 is a plan view of the apparatus;

Fig. 2 is a longitudinal sectional view on the line 2—2 of Fig. 1;

Fig. 3 is a section on the line 3—3 of Fig. 2;

Fig. 4 is a view of a solar-spectrum, showing the divisions according to the Fraunhofer divisions or lines;

Fig. 5 is a plan view of a plate or mask applied to the spectrum, and showing the colors or tints of colors selected according to the major intervals of the chomatic scale;

Fig. 6 is a view of the same mask shown in Fig. 5, but showing the same as applied to sections of two adjoining spectra;

Fig. 7 is a plan view of a plate or mask applied to a spectrum, and having openings therethrough disclosing the colors or tints corresponding to the intervals of the major chord or the minor chord of the chromatic scale, and Fig. 8 is a view of a plurality of spectra placed end-to-end in sequence and of varying intensity or degrees of color if desired.

Before proceeding with a detailed description of the apparatus employed for practising my invention, I desire to make it understood that I do not limit myself to the particular apparatus shown and described, as the invention in its application is capable of wide variation without departing from the spirit and scope thereof.

Referring to the drawings by numerals of reference, A designates a base-box preferably oblong in shape, and consisting of end walls 1, 2, and longitudinal front and rear side walls 3, 4, and a bottom wall 5. Hingedly connected, as at 6, to this base-box is a rectangular oblong box or frame B, consisting of longitudinal side walls 7, 8, and end walls 9, 10, which form vertical extensions of the end walls and side walls of the base-box, as clearly appears in Figs. 1 and 2. The box or frame B is provided with a table or platform 11 closing the top of said box frame and provided adjacent its ends with transverse slots 12, 12, for a purpose to be presently described. The box frame B described may be provided with a cover 13 of any suitable construction, preferably hinged as at 14 to the wall 8. Within the box frame B, beneath the platform or table 11, and adjacent the ends thereof, are arranged rotatable reels or drums 15, 15, having their axes of rotation extending transversely of the box B, upon which drums are wound the opposite ends of a band or web 16 carrying the spectrum or spectra from which the color combinations are to be determined and selected. From said reels or drums, the web 16 passes upward through the said slots 12, 12, and the intermediate portion of said web lies flat upon the platform of table 11 heretofore mentioned. This web or band may carry a spectrum or any number of spectra desired in accordance with the range of capabilities it is intended the apparatus to have. If more than one spectrum is employed, they are arranged end-to-end lengthwise of the band or web, and may be, and preferably are, of gradually decreasing or graded tones, that is, the first spectrum, say that at the left-hand end of the web, may be low and deep toned, and the other spectra gradually lightening or rising in color pitch toward the right, so that a range of colors and tints or shades will be available, either of high or low key or intermediate key as may be desirable.

The forward ends of the shafts or pintles 15ª, of the drums 15, 15, may be provided with hand-knobs 17, by means of which said drums may be rotated to pay out and wind up the web 16, so as to bring any desired area thereof in position upon the platform or table 11. By the means just described the desired spectrum or portions of adjacent spectra may be located on the table to permit the selection of the desired combinations of color.

The web or band 16, in the embodiment illustrated, preferably bears seven (although it may bear more or less than this number) representations of the solar spectrum which, beginning at the left end, are low and deep toned and gradually lighten or rise in pitch as they progress toward the right-hand end of the band. I preferably employ a trans verse division line to mark the beginning and ending of each representation of the spectrum and within the area between the adjacent lines lies what I term "an octave of color."

In Figs. 4 and 8 wherein are shown one spectrum and also a strip embodying three spectra, I have indicated by letters or initials the names of the various colors shown, which will be clear from the following:

V R indicates violet-red; R indicates red; R R O indicates red-red-orange; R O indicates red-orange; O R O indicates orange-red-orange; O indicates orange; O Y O indicates orange-yellow-orange; Y O indicates yellow-orange; Y O Y indicates yellow-orange-yellow; Y indicates yellow; Y Y G indicates yellow-yellow-green; Y G indicates yellow-green; G Y G indicates green-yellow-green; G indicates green; G B G indicates green-blue-green; B G indicates blue-green; B B G indicates blue-blue-green; B indicates blue; B B V indicates blue-blue-violet; B V indicates blue-violet; V B V indicates violet-blue-violet; V indicates violet.

I will now proceed to describe one means for determining or indicating harmonious color combinations upon a spectrum or combination of spectra, for instance, such as indicated on the said band 16, and in order that the same and its operation will be fully understood, I would first state that it is well-known that every visible graduation of pure color is to be found within the bounds of the solar spectrum, and that every known gradation of tone is contained within the octave of the chromatic musical scale. With these well-known facts in mind, I provide means for dividing the spectrum into twelve divisions equally spaced, and proportioned to the twelve half-steps or tones of the chromatic musical scale. In order to make this clear, I have illustrated in Fig. 1 a mask 19 having a plurality of openings 20 which are equally spaced apart from each other, and are of such area as to expose the colors on that portion of the spectrum directly beneath the said openings. These openings 20 are twelve in number and correspond to the twelve half-steps of the chromatic musical scale, as clearly indicated in Fig. 1, and a thirteenth opening to repeat the first to make it complete and convenient to obtain an octave of color. When an octave of color is to be determined, the mask and the spectrum may be moved lengthwise relative to each other, so that the black line at one end of the spectrum comes under the left-hand edge of the first opening 20 at the left of the mask 19, so that the twelve openings through the mask expose a scale of color which corresponds to the chromatic scale in music, and the thirteenth repeats the first. If a higher pitch octave of color is desired, the band may be moved to the left, while a lower pitch octave may be obtained by moving the band to the right. This description serves to indicate the manner in which the chromatic musical scale is to be applied to the spectrum to ascertain or determine the divisions or areas of color in the spectrum corresponding to the chromatic scale. It will be understood that the colors exposed through the openings 20 of the mask 19 do not as an aggregate make or indicate any selection or combination of colors as regards the harmonious effect desired.

With the scale or octave of color determined in the manner just described, I am able to apply the principle for making of musical harmonies to the making of color harmonies, by the selection of those openings or indications. The corresponding colors exposed through said openings, will be found to be in correct harmony as combinations of color. For instance, from the standpoint of harmonious musical tone it is known that the notes or musical intervals of the major scale are the foundation for composition of harmonious tone, and this is also true when the colors of the spectrum show through the openings 20 corresponding to the intervals of the musical scale. That is, if the portions of the spectrum exposed through the openings 20, corresponding to a harmonious tone combination of notes selected from the notes or tones C, D, E, F, G, A, B are combined or used together, they will be in color harmony. In order to facilitate such a selection I employ a mask or indicating means such as shown at 21 in Fig. 5, in which appear only those openings or indications 22 which correspond to the intervals of the major scale. This mask 21 may be laid over the spectrum in the same manner as described with reference to the use of the mask 19, and a group of colors will be exposed which are in harmony, and from which harmonious color combination can be made. In this mask, there are contained eight openings, the last one at the right corresponding to C of the next octave higher. This mask 21 may be employed not only to determine those colors in a single spectrum which are in harmony, but also any harmonious color combination including any key color in the spectrum. For instance, if one wishes to find the harmoniously related colors to orange or green, or any other color of the spectrum, it is only necessary to adjust the web until the required key color appears in the first opening at the left, and it will be found that this color, with the others exposed, will form a harmonious group. This result is indicated in Fig. 6, in which red is made to appear at the first opening, and at the other openings, will appear red-orange, yellow-orange, yellow-yellow-green, green-blue-green, blue-blue-violet, violet-red, and red, all of which will be in harmony. Red in the next octave of color is repeated at the eighth or last opening. In the case where orange or green, for example is the key color, by bringing that desired color to the first opening at the left, the exposure forms the harmonic group of that color, the mask covering and exposing portions of two representations of the spectrum.

I do not desire to limit myself to the number of indicators or masks shown in the drawings, and described herein. From the indicator or mask of Fig. 1 indicating the twelve (12) half steps in the solar-spectrum corresponding to the twelve half steps in the musical octave known as the chromatic scale, may be developed, if desired, various other indicating means or masks, for instance, a mask showing the major intervals, a mask showing the melodic minor, a mask showing the chromatic minor, a mask showing minor and major chords (illustrated in Fig. 6), a mask showing diminished sevenths, and a mask showing the eccentric chords used by some of the modern composers of music. All of these are included within the mask (shown in Fig. 1) indicating the chromatic scale. By means of this mask (shown in Fig. 1) any musical composition arranged for the pianoforte may be translated into color.

In Fig. 7 I have shown a mask containing but four openings which represent a means of obtaining the major and minor chords of the key shown in mask 19. By the use of this indicating means the major and minor chords of harmonious color may be selected, for instance, the colors appearing through the first three openings from the left will be a major chord of colors in harmony, and the first three colors from the right will be a minor chord of colors in harmony. The band or web may be shifted from right to left to any position relative to the openings, but no matter what position it reaches there will be exposed a major and minor chord of color harmony.

It will thus be seen that a harmonious combination of musical tone may be, and is employed in accordance with my invention to ascertain or determine a group of colors the individuals of which are harmoniously correlated.

It will be understood that I do not limit my invention to the use of a mask or masks as the indicating means, as other means operating on the same principle involved may be employed without departing from the spirit and scope of my invention. I also do not desire to be limited to the mounting of the spectrum or spectra upon a band, but merely show this means as being a convenient one, and one which lends itself readily to the mounting of several spectra in proper relation to each other.

The arrangement or construction of the apparatus shown and described is merely by way of exemplification in order to provide a convenient and self-contained device.

It will be noted that the base-box structure 5 serves as a container for those indicating devices, for instance, the masks which may not be in use, as indicated in Fig. 5.

In Fig. 1 it will be noted that the side and end walls of the box or frame B are extended above the level of the platform 11, so as to provide a peripheral flange which serves to properly locate the mask on the platform, so that the openings through the mask will be in proper relation to the corresponding areas of the underlying spectrum band. The intermediate frame B may be provided with hooks 26 adapted to coöperate with eyes 27 on the base-box A, whereby the parts A and B may be secured together. The box B may also be provided with hooks 28 to coöperate with eyes 29 on the cover, whereby the latter is held closed.

I have illustrated in the drawings a representation of the spectrum by indicating the primary colors, shades and tints by means of definite areas of the same, but it will be understood that this method of illustration is adopted because of the inability to depict the spectrum in its true form by means of black ink, and that while such representation is within the scope of my invention, the invention also contemplates in the actual instrument the correct representation of the colors and gradual blending or transition thereof as they appear in the true spectrum.

The openings in the masks are preferably limited in width so that individually they may be adjusted not to show more than one area of color of the spectrum. It will be understood, that the color harmonies are not limited to those exposed by the masks described, which for example, are only for half-tones in the chromatic, because harmonies will also be produced in case the masks be constructed to indicate quarter, eighth or any other value of note.

What I claim and desire to secure by Letters Patent of the United States is:—

1. An instrument of the character described, comprising a representation of the solar spectrum, and means comprising a representation of a musical tone harmony associated therewith for selecting a harmonious color combination.

2. A device of the character described, comprising a representation of the solar spectrum, and indicating means operable to selectively indicate harmonious combinations of color corresponding to harmonious tone combinations of the notes of an octave of the chromatic scale.

3. A device of the character described, comprising a representation of the solar spectrum, and a mask adapted to lie over the spectrum and having openings spaced according to the notes of the chromatic scale which are in harmony.

4. A device of the character described, comprising a representation of the solar spectrum, and a mask adapted to lie over the spectrum and having openings corresponding to harmonious tone combinations of an octave of the chromatic scale.

5. A device of the character described, comprising a representation of the solar spectrum, and a mask adapted to lie over the spectrum and having openings spaced to correspond to a combination of harmonious notes of an octave of equally spaced notes of a chromatic scale coextensive with the spectrum.

6. A device of the character described, comprising a plurality of representations of equal length of the solar spectrum, and a mask having openings spaced from each other to correspond to a combination of harmonious notes of an octave of equally spaced notes of a chromatic scale coextensive with one of said spectra.

7. A device of the character described, comprising a plurality of representations of equal length of the solar spectrum, a mask having openings spaced from each other to correspond to a combination of harmonious notes of an octave of equally spaced notes of a chromatic scale coextensive with one of said spectra, and means for causing a relative movement of said mask and spectra longitudinally of the latter.

8. A device of the character described, comprising a representation of the solar spectrum, a mask adapted to lie over the spectrum and having openings spaced to correspond to a combination of harmonious notes of an octave of equally spaced notes of a chromatic scale coextensive with the spectrum, and means for causing a relative movement of said mask and spectrum longitudinally of the latter.

9. A device of the character described, comprising a representation of the solar spectrum, and indicating means operable to selectively indicate harmonious combinations of colors to correspond to a combination of harmonious notes of an octave of equally spaced notes of a chromatic scale coextensive with the spectrum.

10. A device of the character described, comprising a plurality of representations of the solar spectrum of equal lengths, and indicating means operative to selectively indicate harmonious combinations of colors to correspond to a combination of harmonious notes of an octave of equally spaced notes of a chromatic scale coextensive with the spectrum.

11. A device of the character described, comprising a representation of the solar spectrum according to the Fraunhofer divisions and means for indicating a color combination thereon in accordance with a musical tone harmony.

12. A device of the character described, comprising a representation of the solar spectrum, and indicating means dividing said spectrum into areas of color, said means consisting of indicia spaced according to the notes of a chromatic scale coextensive with the spectrum.

13. A device of the character described, comprising a representation of the solar spectrum, and indicating means coöperable therewith to select colors to correspond to a combination of the notes of an octave of equally spaced notes of a chromatic scale coextensive with the spectrum.

14. A device of the character described, comprising a casing, drums in the casing, a web wound on the drums, said web bearing a representation of the solar spectrum, and indicating means coöperating with the spectrum for determining a harmonious color combination thereon in accordance with a musical tone harmony.

15. A device of the character described, comprising a casing, drums in the casing, a web wound on the drums, said web bearing a representation of the solar spectrum, and a mask adapted to lie over the spectrum and having openings spaced according to the notes of a chromatic scale coextensive with the spectrum.

16. A device of the character described, comprising a casing, drums in the casing, a platform over the drums, a web wound on the drums and lying on the platform, said web bearing a representation of the solar spectrum, and indicating means coöperating with the spectrum to indicate thereon a combination of harmonious colors corresponding to a combination of harmonious notes of an octave of equally spaced notes of a chromatic scale coextensive with the spectrum.

17. A device of the character described, comprising a casing, drums in the casing, a platform over the drums, a web wound on the drums and lying on the platform, said web bearing a representation of the solar spectrum, and a mask adapted to lie over the spectrum and having openings spaced according to the notes of a chromatic scale coextensive with the spectrum.

In testimony whereof I have hereunto signed my name in the presence of two subscribing witnesses.

HENRY FITCH TAYLOR.

Witnesses:
C. G. HEYLMUN,
E. M. LOCKWOOD.

Copies of this patent may be obtained for five cents each, by addressing the "Commissioner of Patents, Washington, D. C."